US011858193B2

United States Patent
Zanelli et al.

(10) Patent No.: US 11,858,193 B2
(45) Date of Patent: Jan. 2, 2024

(54) APPARATUS FOR BLOW MOLDING CONTAINERS

(71) Applicant: SACMI IMOLA S.C., Imola (IT)

(72) Inventors: Matteo Zanelli, Imola (IT); Mirco Massari, Parma (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 18/073,677

(22) Filed: Dec. 2, 2022

(65) Prior Publication Data

US 2023/0173735 A1 Jun. 8, 2023

(51) Int. Cl.
*B29C 49/36* (2006.01)
*B29C 49/42* (2006.01)
*B65G 47/91* (2006.01)
*B29L 31/00* (2006.01)

(52) U.S. Cl.
CPC ........ *B29C 49/36* (2013.01); *B29C 49/42065* (2022.05); *B29C 49/42079* (2022.05); *B65G 47/91* (2013.01); *B29L 2031/712* (2013.01)

(58) Field of Classification Search
CPC ............... B29C 49/36; B29C 49/4205; B29C 49/42065; B29C 49/42079; B29C 49/42085; B65G 47/91; B65G 47/902; B65G 47/914
See application file for complete search history.

(56) References Cited

U.S. PATENT DOCUMENTS

| 4,355,968 | A | * | 10/1982 | Lagoutte | B29C 49/4205 |
| | | | | | 425/526 |
| 5,538,304 | A | * | 7/1996 | Daehne | B66C 1/46 |
| | | | | | 294/93 |
| 6,779,651 | B1 | | 8/2004 | Linglet et al. | |
| 8,202,079 | B2 | | 6/2012 | Litzenberg et al. | |

(Continued)

FOREIGN PATENT DOCUMENTS

| DE | 102018110803 A1 | 11/2019 |
| GB | 1439723 A | 6/1976 |
| WO | 2011051586 A1 | 5/2011 |

OTHER PUBLICATIONS

Italian Search Report for Italian Application No. 202100030506 dated Jun. 24, 2022, 6 pages.

(Continued)

*Primary Examiner* — Robert B Davis
(74) *Attorney, Agent, or Firm* — CANTOR COLBURN LLP

(57) ABSTRACT

An apparatus for blow molding plastic containers includes a blow molding carousel and is connected, at a first transfer station, to a feeding line of preforms, the first transfer station having a transfer carousel supporting grip elements which are associated with at least one respective grip body. Each grip element has a first arm, which is supported so that it can rotate by the transfer carousel in order to rotate on command about a substantially vertical pivoting axis, and a second arm, which extends longitudinally and can slide on com- (Continued)

mand with respect to the first arm along an advancement/retraction direction which is substantially parallel to its own direction of extension. The grip body includes a coupling element which is configured to stably hold the preform.

12 Claims, 13 Drawing Sheets

(56) References Cited

U.S. PATENT DOCUMENTS

| | | | |
|---|---|---|---|
| 2009/0004322 A1* | 1/2009 | Legallais | B29C 49/42069 |
| | | | 425/534 |
| 2011/0142981 A1 | 6/2011 | Borgatti et al. | |
| 2012/0048683 A1 | 3/2012 | Forsthoevel et al. | |

OTHER PUBLICATIONS

Italian Search Report for Italian Application No. 202100030539 dated Jul. 4, 2022, 7 pages.
European Search Report for European Application No. 22210818.5, dated Mar. 13, 2023, 5 pages.
European Search Report for European Application No. 22210822.7, dated Mar. 14, 2023, 5 pages.

\* cited by examiner

APPARATUS FOR BLOW MOLDING CONTAINERS

CROSS-REFERENCE TO RELATED APPLICATIONS

This application is related to and claims the benefit of Italian Patent Application No. 102021000030539, filed on Dec. 02, 2021 and Italian Patent Application No. 102021000030506, filed on Dec. 02, 2021, the contents of which are herein incorporated by reference in their entirety.

TECHNICAL FIELD

The present disclosure relates to an apparatus for blow molding plastic containers.

BACKGROUND

Systems are known for blow molding plastic containers which comprise an apparatus for blow molding preforms so as to obtain containers, such as for example bottles.

The preforms are fed to the apparatus for blow molding the preforms by way of a conveyor associated with a thermal conditioning oven for the preforms.

The conveyor is normally associated with a device for transferring the preforms, which is constituted for example by a handling device, which picks up the preforms from the conveyor in order to transfer them to the apparatuses for blow molding.

An apparatus for blow molding plastic containers is known from WO2010/013206 in the name of this same applicant, which comprises a blow-molding machine for blow molding the bottles, a feeding line of the preforms to the blow-molding machine, and a line for unloading the bottles from the blow-molding machine.

The blow-molding machine comprises a blow molding carousel, which can rotate about a vertical axis, and is operatively connected, at a first and at a second transfer station, to the feeding line of the preforms and to the line for unloading the bottles.

The carousel supports, at its peripheral rim, a plurality of forming units, which are uniformly distributed about the axis of the carousel with a determined spacing.

Each forming unit comprises a mold formed by two mold parts, each one of which is hinged to the carousel in order to rotate, under the thrust of an actuation device, about a pivoting axis, parallel to the axis of the carousel, between an open position and a closed position in which it defines two forming cavities.

The two mold parts are oriented so as to be closed at a closing plane that is substantially tangential or perpendicular with respect to the path of the forming unit.

The feeding of the preforms to the forming units is carried out using a transfer carousel that can rotate about an axis that is parallel to the axis of the blow molding carousel, and which has, along its peripheral rim, a plurality of grip units which protrude radially.

Each grip unit comprises a supporting rocker, which is hinged to the transfer carousel in order to rotate about a substantially vertical pivoting axis and which has, at a first arm thereof, a cam follower which is designed to come into contact with a cam adapted to control the angular position of the rocker about the pivoting axis.

The rocker has an elongated second arm which is engaged so that it can slide by a slider, which is provided, in turn, with a cam follower which is in contact with a cam adapted to control the position of the slider along the arm, and it supports, at a free end thereof that protrudes outside the arm, a grip assembly which comprises a rocker body hinged to the slider in order to rotate, with respect to the slider and under the thrust of a mechanical or motorized actuation device, about a vertical fulcrum axis.

The solution described above, although making it possible to feed the preforms to the forming units, even if such units define each two mold parts with a closing plane that is tangential or perpendicular to the main carousel, has some drawbacks.

Firstly, there is a certain complexity in the kinematic mechanism for moving the grip elements with a high number of degrees of freedom, which needs to be suitably managed.

Furthermore, the grip units are configured to close around the external surface of the neck of the preform. This determines some difficulties if the preforms have particularly large diameters, or if the preforms do not have a particularly prominent neck.

SUMMARY

The aim of the present disclosure is to provide an apparatus for blow molding containers that is capable of improving the known art in one or more of the above mentioned aspects.

Within this aim, the disclosure makes available an apparatus for blow molding containers that makes it possible to efficiently and reliably pick up the preforms, even with non-standardized shape structures, in order to feed them to the molds.

The disclosure also provides an apparatus for blow molding containers that is highly reliable, easy to implement and of low cost.

This aim and these and other advantages which will become better apparent hereinafter are achieved by providing an apparatus for blow molding containers according to the independent claim, optionally provided with one or more of the characteristics of the dependent claims

BRIEF DESCRIPTION OF THE DRAWINGS

Further characteristics and advantages of the disclosure will become better apparent from the description of some preferred, but not exclusive, embodiments of the apparatus for blow molding containers according to the disclosure, which are illustrated for the purposes of non-limiting example in the accompanying drawings wherein.

DETAILED DESCRIPTION OF THE DRAWINGS

Figure 1:
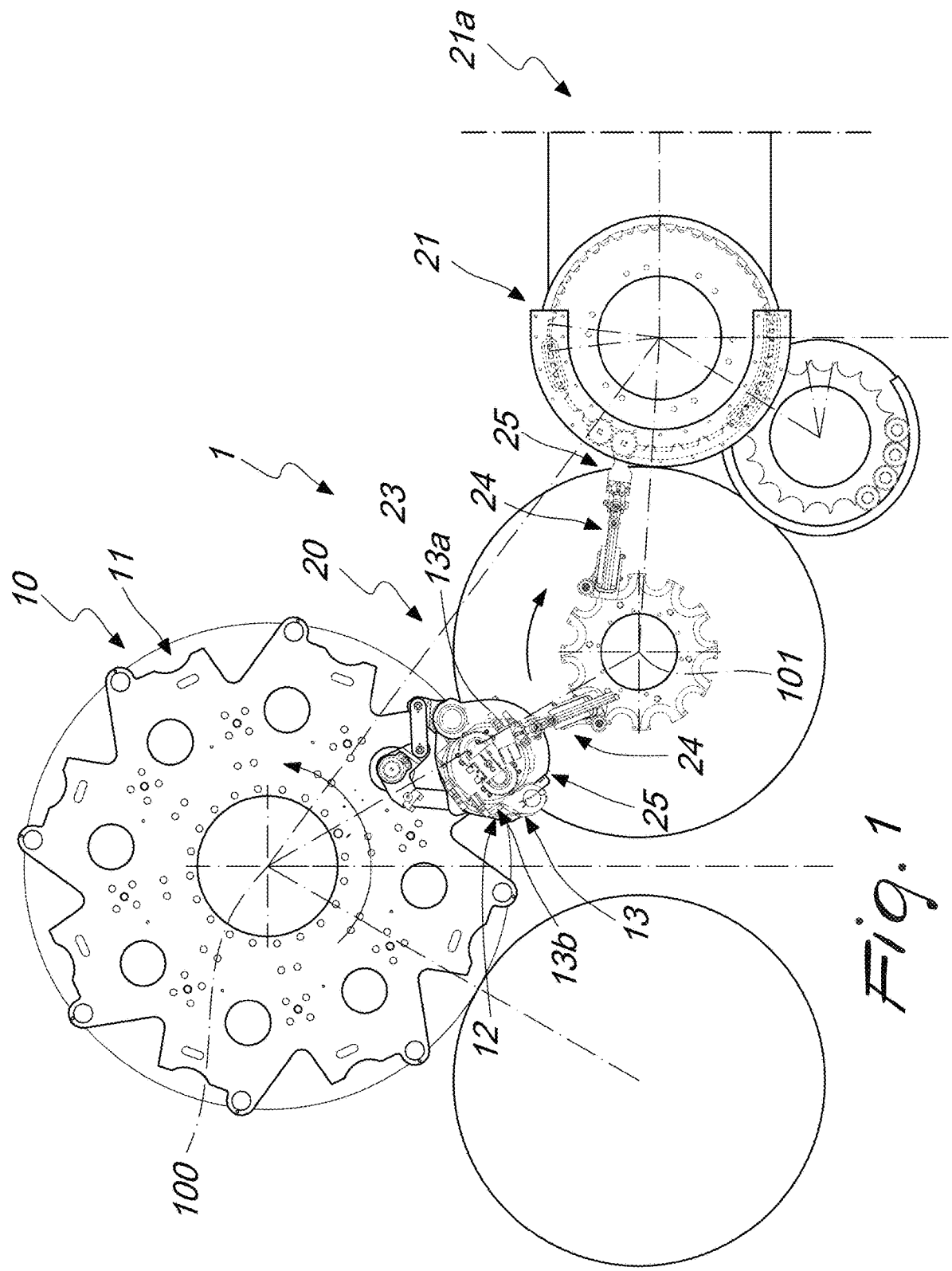
FIG. 1 is a plan view from above of the blow molding apparatus according to the disclosure.
Figure 2:
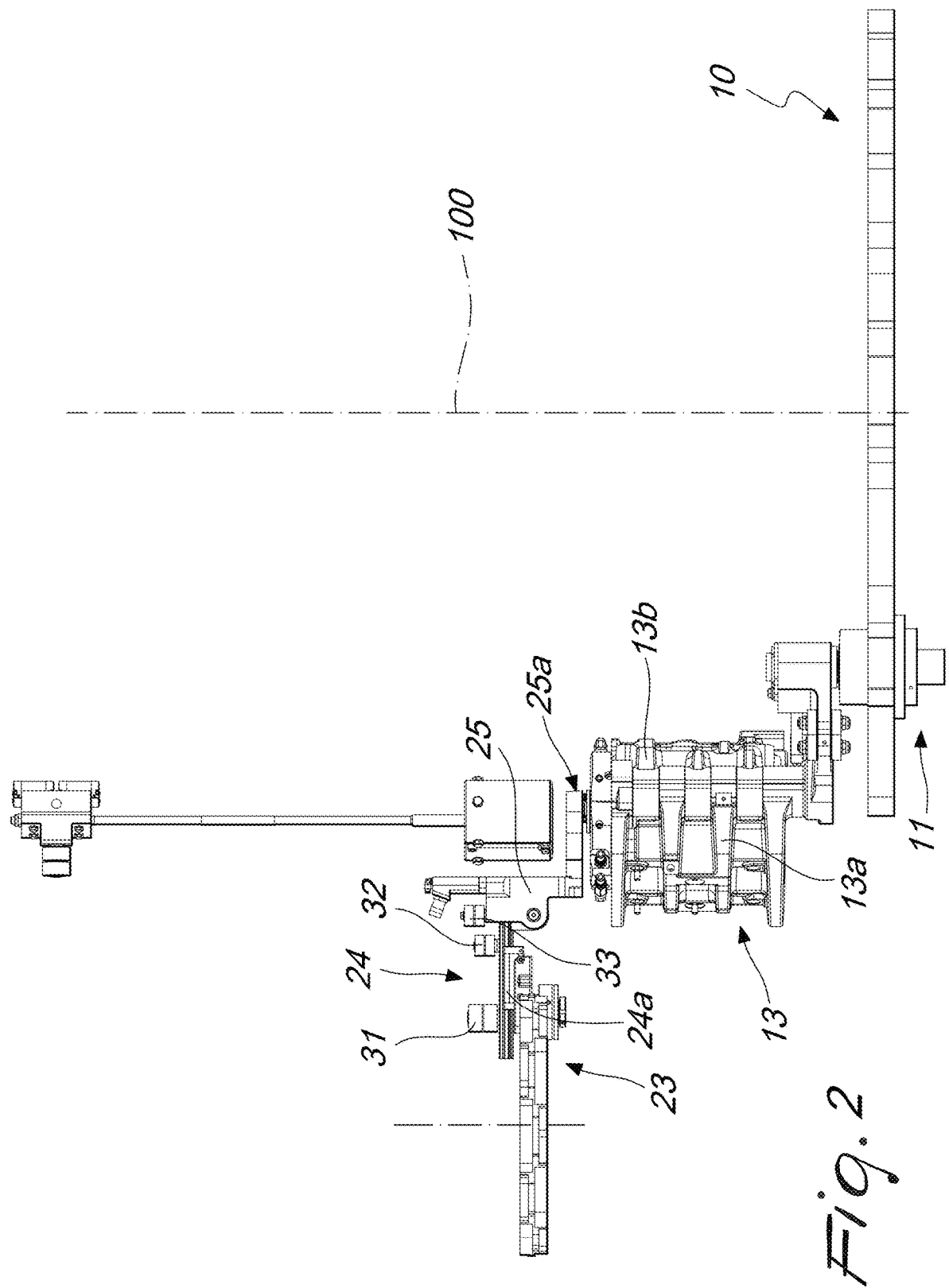
FIG. 2 is a side view of the blow molding apparatus of FIG. 1 at the release region, with the grip body in the position for releasing the preform into the forming cavity.

With reference to the figures, the system according to the disclosure, generally designated by the reference numeral 1, comprises an apparatus for blow molding plastic containers which comprises a blow molding carousel 10 which can rotate about a main rotation axis 100 and is operatively connected, at a first transfer station 20, to a feeding line 21 of preforms 50.

The preforms 50 are of the type comprising a preform body 51 and a preform mouth 52.

The blow molding carousel 10 supports, at its peripheral region 11, a plurality of forming units 12 arranged around the main rotation axis 100.

Each forming unit 12 comprises a mold 13 formed by two mold parts 13a, 13b which can move with respect to each other, in order to pass from an open position for feeding the preforms 50, and a closed position in which it defines at least one forming cavity.

The first transfer station 20 comprises a transfer carousel 23 which can rotate about an axis of the transfer carousel 101 that is parallel to the main rotation axis 100. The first transfer station 20 supports a plurality of grip elements 24 which are associated with at least one respective grip body 25 which is designed to pick up at least one respective preform 50 from the feeding line 21 in order to feed it to a respective forming cavity.

The grip element 24 comprises a first arm 24a, which is supported so that it can rotate by the transfer carousel 23 in order to rotate on command about a substantially vertical pivoting axis 102, and a second arm 24b, which extends longitudinally and can slide on command with respect to the first arm 24a along an advancement/retraction direction 200 which is substantially parallel to its own direction of extension.

According to the present disclosure, the grip body 25 comprises a coupling element 25a which is configured to stably hold the preform 50 substantially by the preform mouth region 52.

The coupling element 25a is movable on command with respect to the second arm 24b along a movement trajectory 301 which has at least one component that is parallel to the vertical direction.

In particular, the coupling element 25a can move along the movement trajectory 301 substantially at the step of disengagement from the preform mouth 52.

According to a possible practical embodiment, the grip body 25 is supported so that it can rotate by the second arm 24b in order to rotate on command about a tilting axis 103 which is substantially horizontal and substantially perpendicular to the advancement/retraction direction 200 substantially at the step of disengagement from the preform mouth 52.

The angular movement of the grip body 25 about the tilting axis 103 determines, in this case, the movement of the coupling element 25a along the movement trajectory 301.

Figure 3:
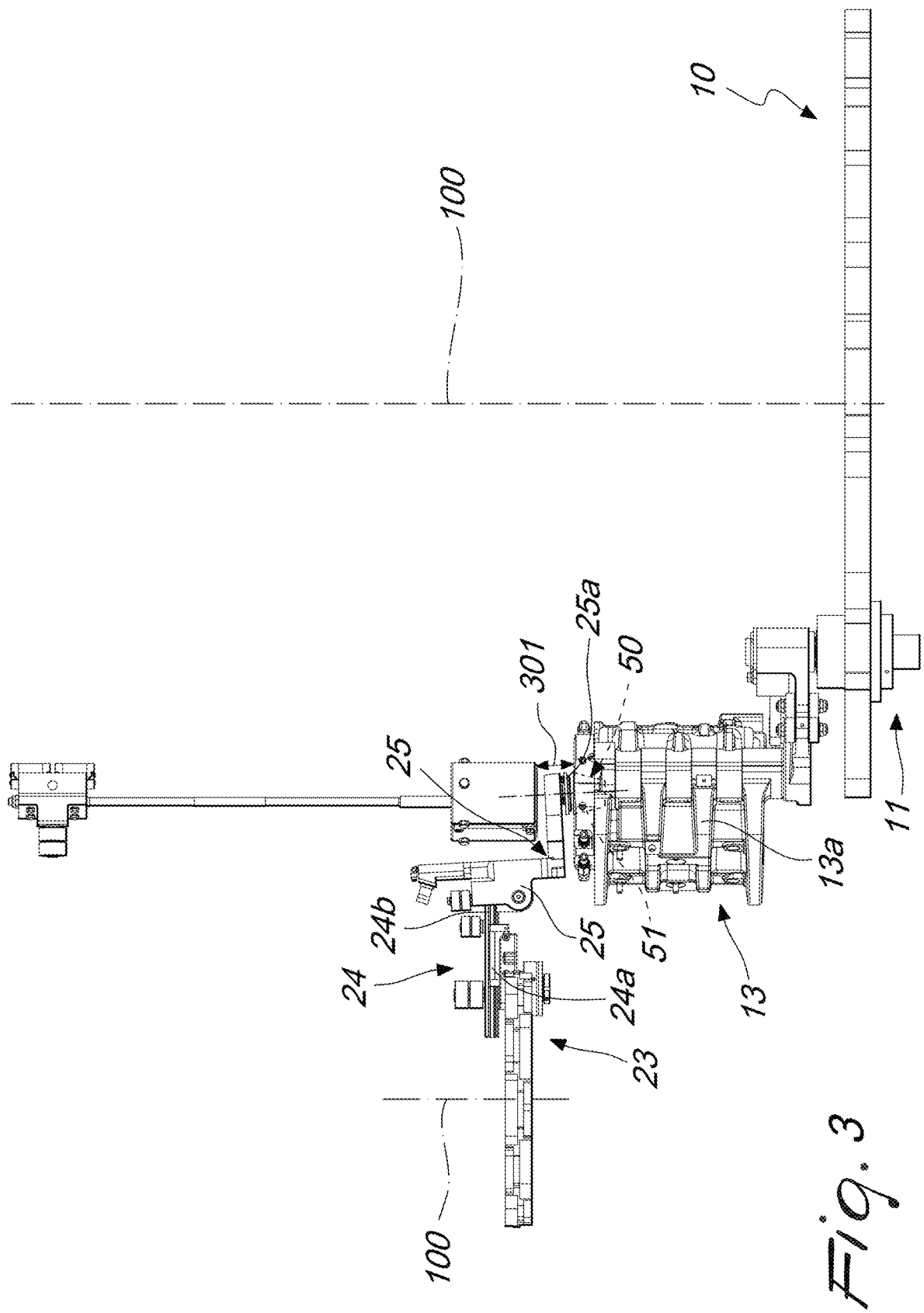
FIG. 3 is a view similar to that of FIG. 2 with the grip body in the position after the release of the preform.
Figure 4:
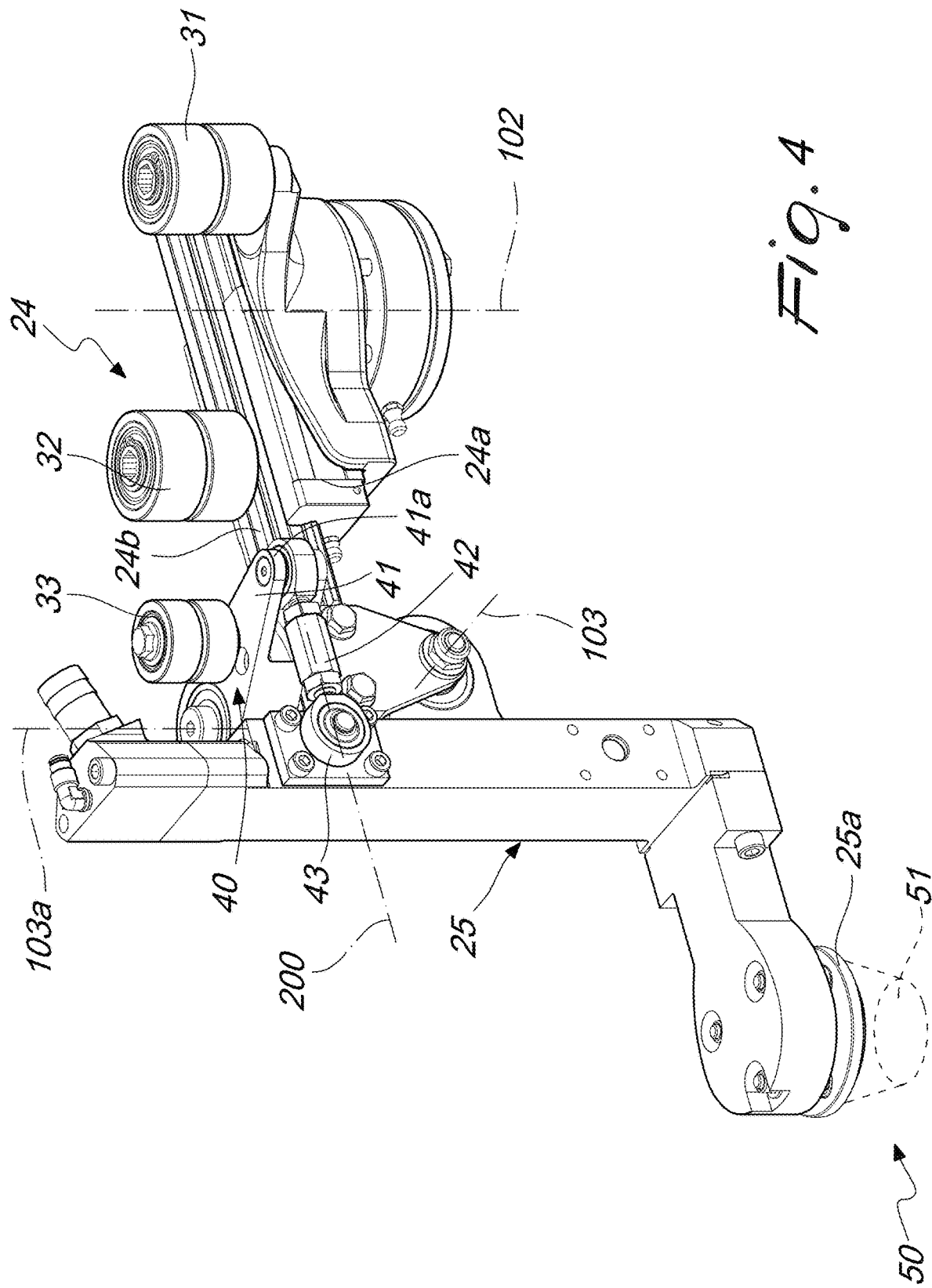
FIG. 4 is a perspective view of the grip element associated with a preform.

In particular, as shown in FIGS. 3 and 4, the grip body 25 is made to rotate about the tilting axis 103 from a transport and release position, in which the axis of the coupling element 25a (which coincides with the axis of the preform 50 associated therewith) is arranged substantially vertically, to a disengagement position in which the axis of the grip body is inclined with respect to the vertical. This transition is completed as soon as the coupling element 25a has released the respective preform 50 in the respective forming cavity.

According to another possible, and in some applications preferred, embodiment (shown in FIGS. 5 to 7), the grip body 25 is supported so that it can slide by the second arm 24b along a substantially vertical movement direction so as to allow its displacement along the movement trajectory 301.

During the transition from the transport and release position to the disengagement position, the coupling element 25a is furthermore brought to a higher level than to the level where it is in the transport and release position, so as to prevent any interference with the movable mold parts 13a, 13b.

Advantageously (as illustrated in the perspective view of FIG. 4), the coupling element 25a is operatively associated with air suction means 70 and is configured to couple hermetically with the preform mouth 52 so as to hold the preform 50.

Specifically, the air suction means 70 comprise a suction conduit 72 leading into a suction intake 73 defined at the coupling element 25a.

A flow control valve is arranged along the suction conduit 72.

Figure 5:
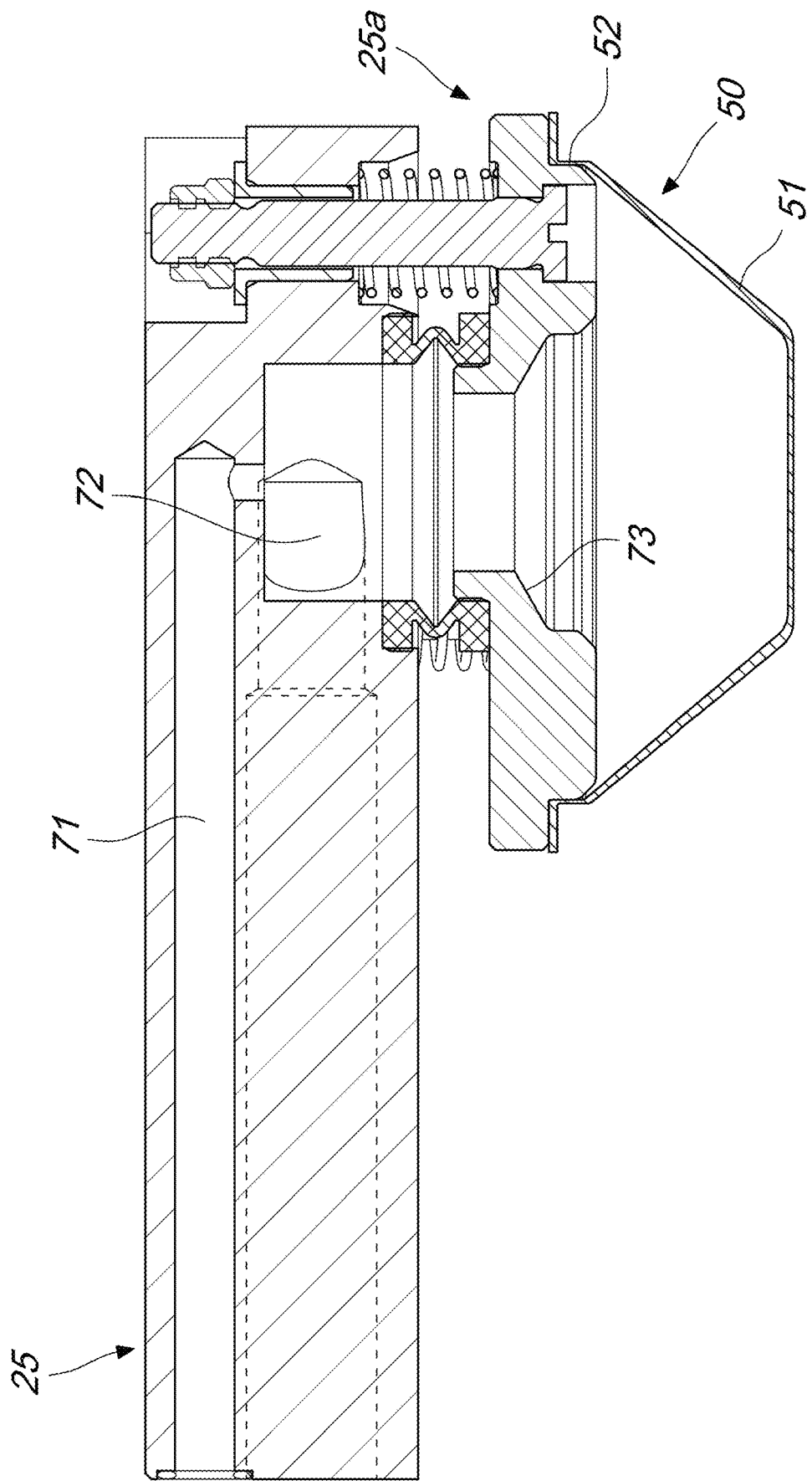
FIG. 5 is a cross-sectional view of the grip element of FIG. 4.
Figure 6:
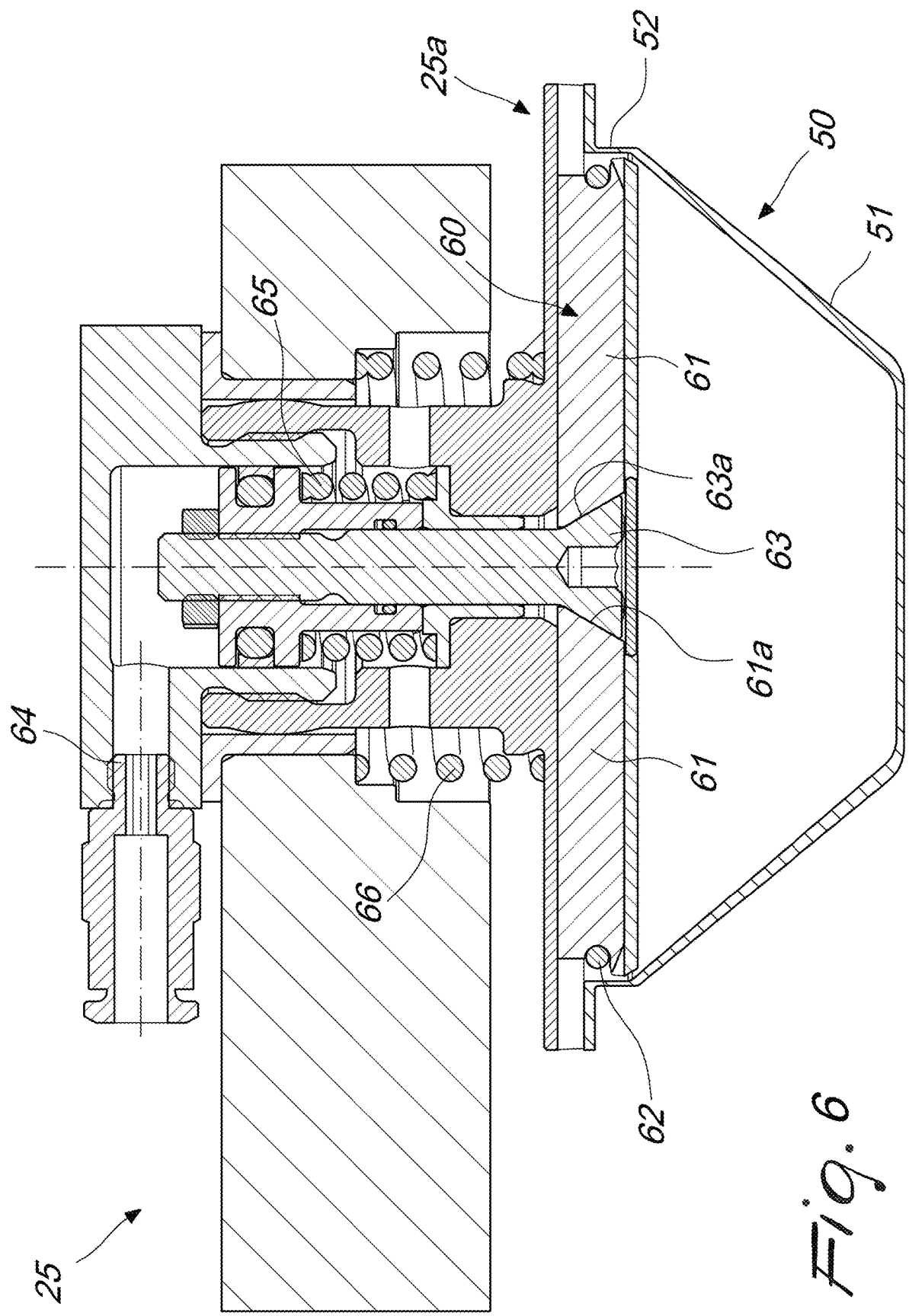
FIG. 6 is a cross-sectional view of a variation of the embodiment of the grip body in the condition of disengagement from the preform.
Figure 7:
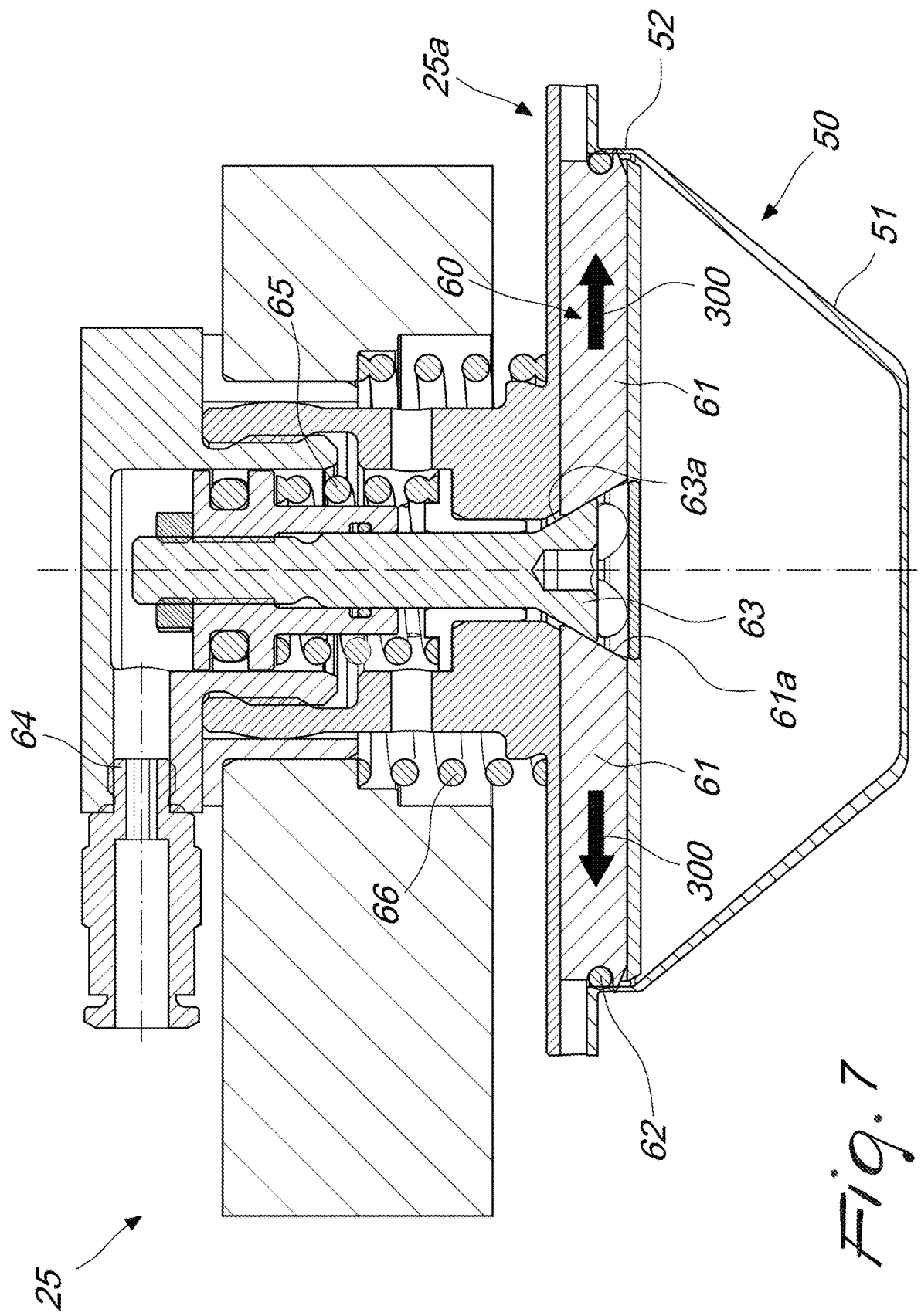
FIG. 7 is a view similar to the previous view with the grip body in the condition of engagement with the preform.

With reference to the embodiment illustrated in FIG. 5, a partial vacuum is generated inside the preform 50; with reference to what is shown in FIGS. 6 and 7, instead, the coupling element 25a comprises an element which can expand radially on command in order to engage against the internal surface of the preform 50 substantially at the preform mouth 52 so as to hold the preform 50.

In particular, the radially expandable element comprises, for example, retention sectors 61 which are adapted to transition, on command, from a retracted condition (shown in FIG. 6) and an expanded position (shown in FIG. 7).

Preferably, the movement on command of the retention sectors 61 from the retracted condition and the expanded condition occurs against elastic means which comprise, for example, an O-ring 62.

The transition from the retracted condition and the expanded condition can occur by way of the movement of an actuation element 63 which has a frustum-shaped portion 63a that engages a complementarily-shaped surface 61a defined on the retention sectors 61 so that a displacement in the axial direction of the actuation element 63 determines a displacement in a radial direction (indicated by the arrow 300 of FIG. 7) of the retention sectors 61.

The displacement of the actuation element 63 can be controlled by a pneumatic valve 64 in contrast with the action of a spring 65.

There can also be an interconnection spring 66 that acts between the coupling element 25a and the grip body 25.

Figure 8:
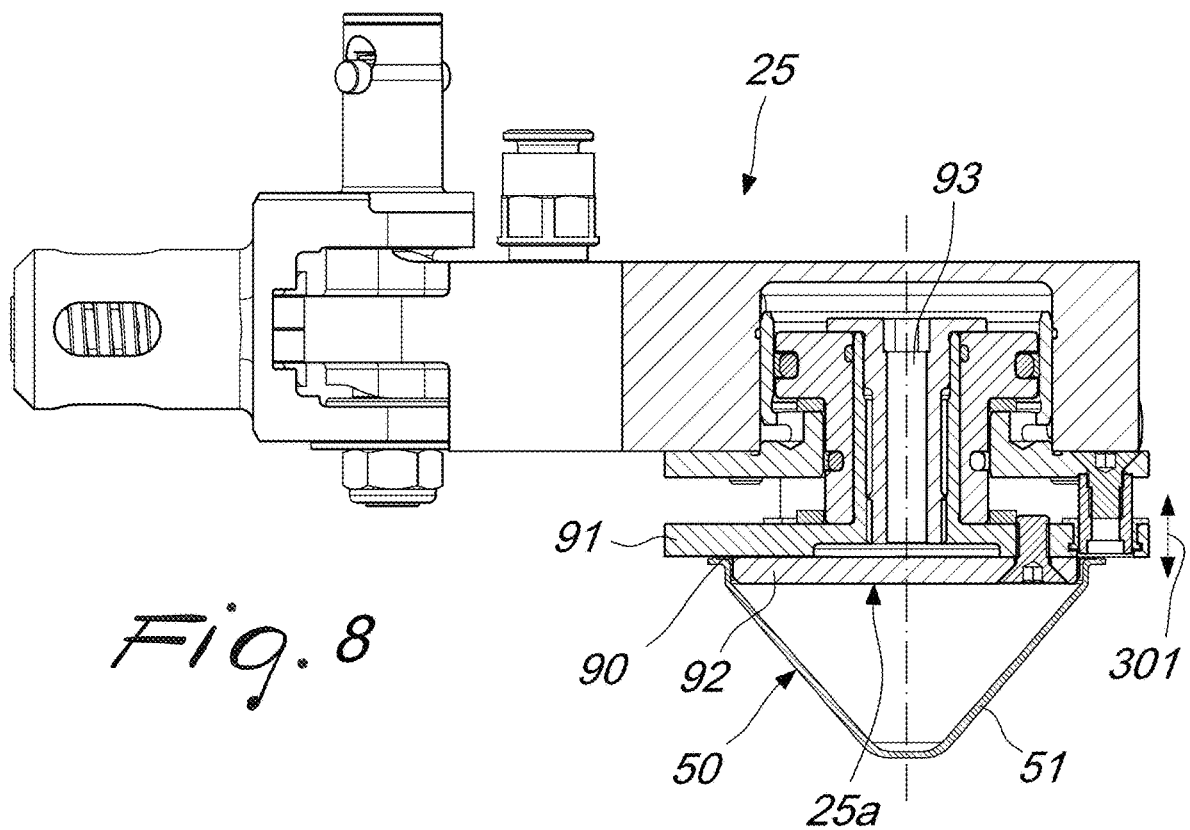
FIG. 8 is a view similar to FIG. 5 of an additional variation of the embodiment of the grip body in the condition of engagement with the preform.
Figure 9:
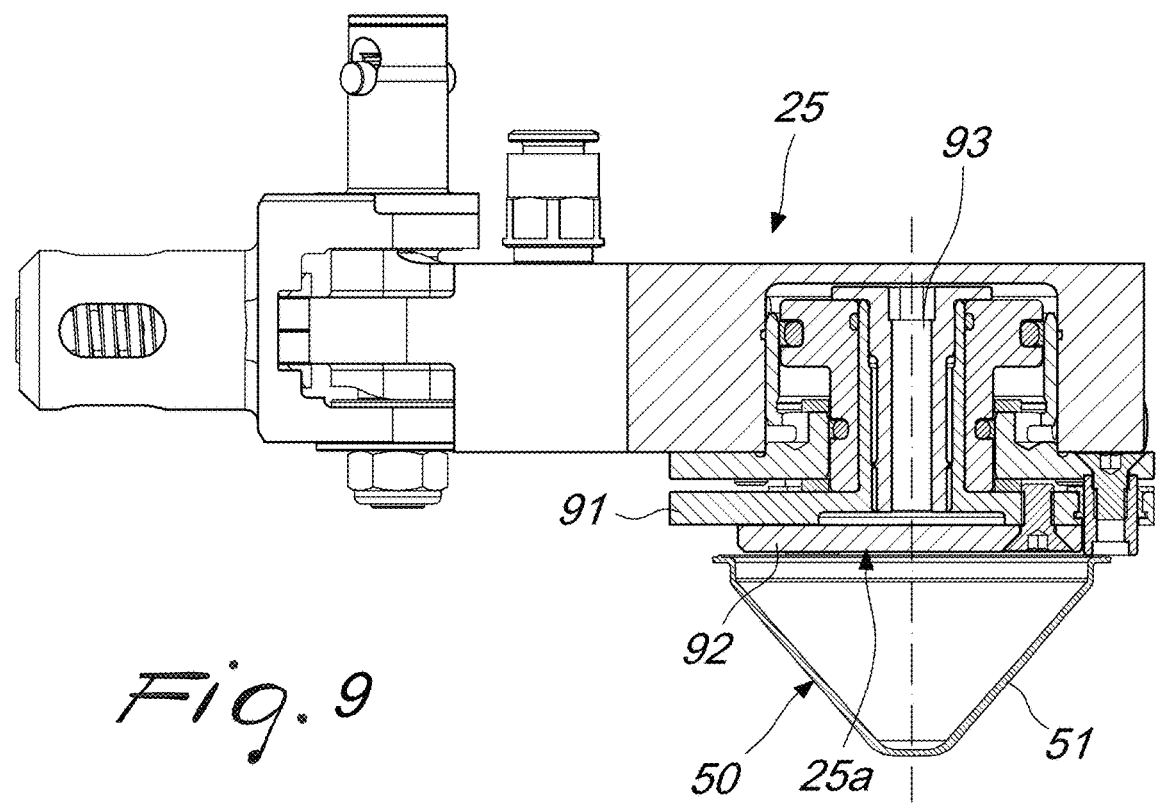
FIG. 9 is a cross-sectional view of a variation of the embodiment of FIG. 7 of the grip body in the condition of disengagement from the preform.

With reference to the embodiment shown in FIGS. 8 and 9, it is possible for the coupling device 25a to be configured in such a way to hold the preform 50 by virtue of means that are adapted to provide an air blade 90 that is directed parallel to a coupling portion 25a defined by the preform 50.

Specifically, the means adapted to provide an air blade 90 comprise two plate-like elements 91 and 92, mutually spaced apart so as to define an annulus-shaped gap that leads, outward, into an outlet. The outlet is arranged proximate to, advantageously above, the coupling portion 25a, so that an air flow, supplied by a supply channel connected to the gap, can generate an air blade that will strike the coupling portion 25a and as a consequence, substantially owing to the Bernoulli effect, can ensure the preform 50 is held without in practice there being any contact between the preform 50 itself and the coupling element 25a.

In more detail, the apparatus 1 comprises a first cam (not shown) which is supported by a supporting structure and can be engaged by at least one first engagement element 31 associated with the first arm 24a in order to control the angular position of the first arm 24a about the pivoting axis 102 during its rotation about the axis of the transfer carousel 101.

By way of example, the first arm 24a comprises a supporting rocker which is hinged to the transfer carousel 23 in order to rotate about the pivoting axis 102 and is provided with a cam follower which defines the first engagement element 31 and is designed to come into contact with the first cam which is adapted to control the angular position of the supporting rocker about the pivoting axis 102.

The apparatus 1 comprises a second cam which is supported by the supporting structure and can be engaged by at least one second engagement element 32 which is associated with the second arm 24b in order to control the longitudinal position of the second arm 24b with respect to the first arm 24a along the advancement/retraction direction 200 during its rotation about the axis of the transfer carousel 101.

By way of example, the first arm 24a defines a cradle-shaped portion, extending along a direction parallel to the advancement/retraction direction 200, which can be engaged slideably by a respective slider portion which is integral with the second arm 24b.

The apparatus 1 comprises a third cam which is supported by the supporting structure and can be engaged by at least one third engagement element 33 which is associated with the grip body 25 in order to control the angular position of the grip body 25 with respect to the second arm 24b about the tilting axis 103 during its rotation about the axis of the transfer carousel 101.

Obviously, the third cam is not envisaged in the embodiments, such as the embodiments shown in FIGS. 8 and 9, wherein the grip body 25 is supported so that it can slide by the second arm 24b along a substantially vertical movement direction, so as to allow its displacement along the movement trajectory 302.

As already noted, the grip body 25 is designed to rotate about the tilting axis 103 after the release of the preform 50 at the respective forming cavity, so as to facilitate the disengagement of the coupling element 25a from the mold 13 for the grip bodies shown in FIGS. 5 to 7.

In order to enable the third engagement element 33 to maintain its substantially vertical axis during the tilting of the grip body about the tilting axis 103, there is conveniently a kinematic interconnection element 40 arranged between the second arm 24b and the grip body 25.

The kinematic interconnection element 40 comprises a linkage device 41 which supports the third engagement element 33 and is supported by the element 24a about a pivoting axis 103a in order to actuate the movement of a linkage 42 which has, at the ends, two joints 41a and 43 which are connected, respectively, to the linkage device 42 and to the grip body 25.

The feeding line 21 is arranged downstream of a conditioning oven 21a for the preforms 50.

The operation of the apparatus 1 for blow molding containers, according to the disclosure, is the following.

The preforms 50, exiting from the conditioning oven 21a, are brought to the feeding line 21.

At the transfer station 20, the preforms 50 are picked up by virtue of the action of the coupling elements 25a, which engage with the respective preform at the preform mouth 52, by virtue of the action of the air suction/pressure means or via the radially expandable element.

The preforms 50 picked up by the feeding line 21 are then transferred, during the rotation of the transfer carousel 23, to the mold 13. During this transfer, the first arm 23 rotates about the pivoting axis 102 and the second arm 24 slides with respect to the first aim 24a along the advancement/retraction direction 200.

Once the preform 50 is released into the respective forming cavity, the grip body 25 is made to rotate about the tilting axis 103 so as to facilitate the disengagement from the mold 13.

FIGS. 10 to 16 show in more detail possible practical embodiments of the coupling device 25 shown in FIGS. 8 and 9.

In particular, the coupling device 25 comprises a grip device, generally designated in FIGS. 10 to 16 with the reference numeral 1', for the support and movement of preforms 50', which extend along a longitudinal axis 100' and are of the type with an access port 51' which defines, at the rim 51a', an annular radial flaring 52' that lies on a plane of arrangement that is substantially perpendicular to the longitudinal axis 100'.

According to the present disclosure, the grip device 1' comprises a supporting element 2 which is operatively associated with an air supply conduit 3' and is connected to at least one air outflow nozzle 5'.

The at least one nozzle 5' is, in particular, adapted to generate at least one respective flow of air which is designed to arrange itself parallel to at least one portion of the radial flaring 52' of a preform 50' to be held in order to enable the preform 50' to be supported without contact.

In practice, the supporting element 2' is configured so as to provide an annular "Bernoulli" sucker which is designed to face, at least partially, toward the radial flaring 52' of a preform 50' to be held.

Advantageously, the supporting element 2' comprises a centering body 2a' which is designed to engage at the access mouth 51' of the preform 50' to be supported.

Conveniently, the supporting element 2' comprises a delivery port 6', connected to an air delivery conduit 4', which leads, during use, inside the preform 50'.

The supply conduit 3' and, if present, the delivery conduit 4', are connected to means for supplying compressed air or air under pressure (not shown in the figures).

The delivery port 6' is struck, on command, by a flow of air which is adapted to facilitate, if necessary, the disengagement of the preform 50' from the supporting element 2'.

The grip device 1' comprises actuation means which are configured to force the passage of air through the supply conduit 3' so as to enable the supporting element 2' to hold the preform 50'.

These actuation means can be configured to force the passage of air also through the delivery conduit 4', when it is necessary to release the preform 50' from the supporting element 2'.

Conveniently, the supporting element 2' defines a surface, preferably flat, 20', preferably with an annular extension, which is designed to face upward toward the radial flaring 52' of the preform 50'.

In this specific case, the (or each) nozzle 5' is adapted to convey the respective air flow so as to strike the surface 20' so as to create a partial vacuum that is such as to allow the supporting element 2' to hold the preform Specifically, the partial vacuum is substantially generated exclusively at the annular portion 20' arranged opposite to the radial flaring 52' of the preform.

Figure 10:
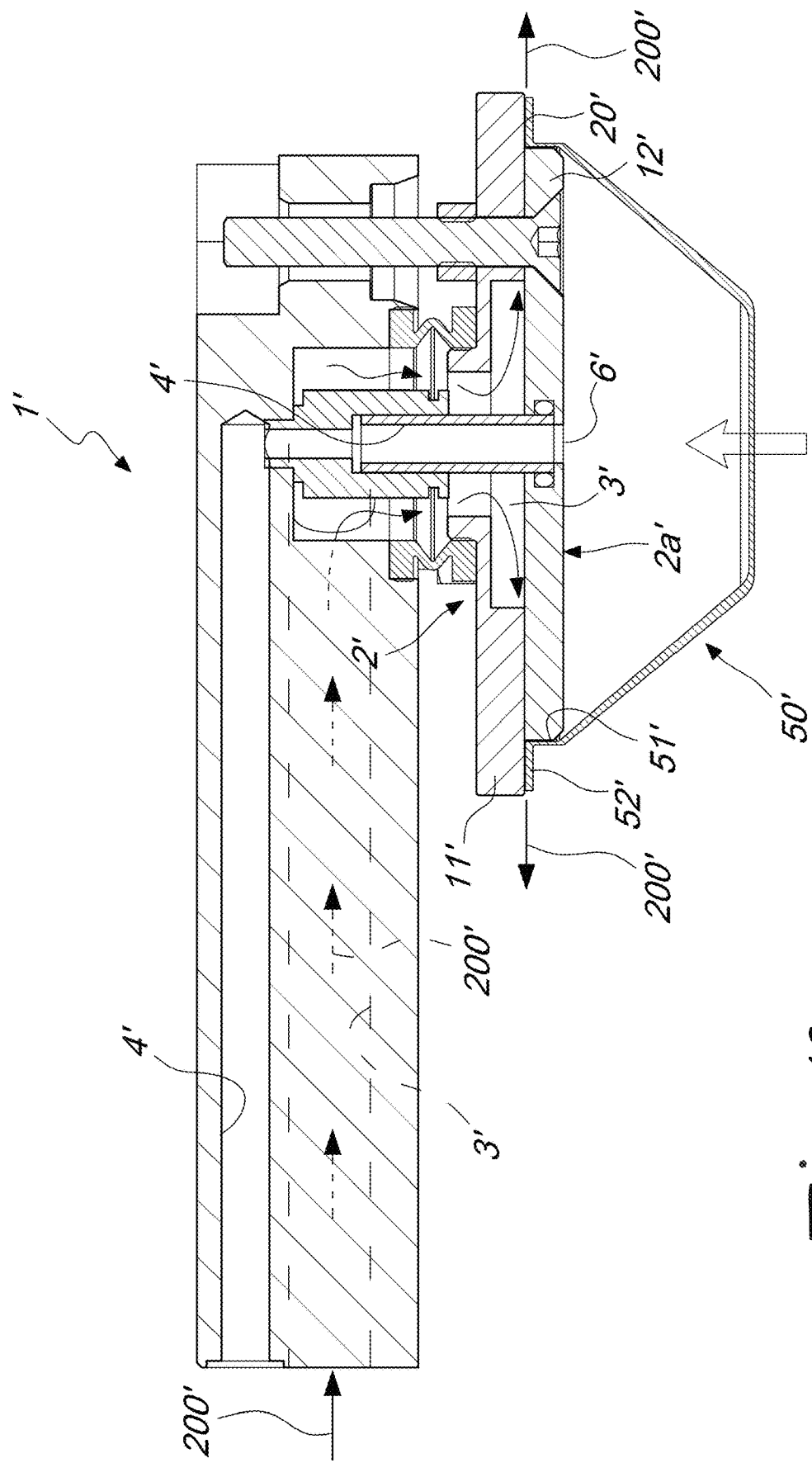
FIG. 10 is a cross-sectional view of a first embodiment of the grip body, wherein the grip element supports and holds a respective preform.
Figure 11:
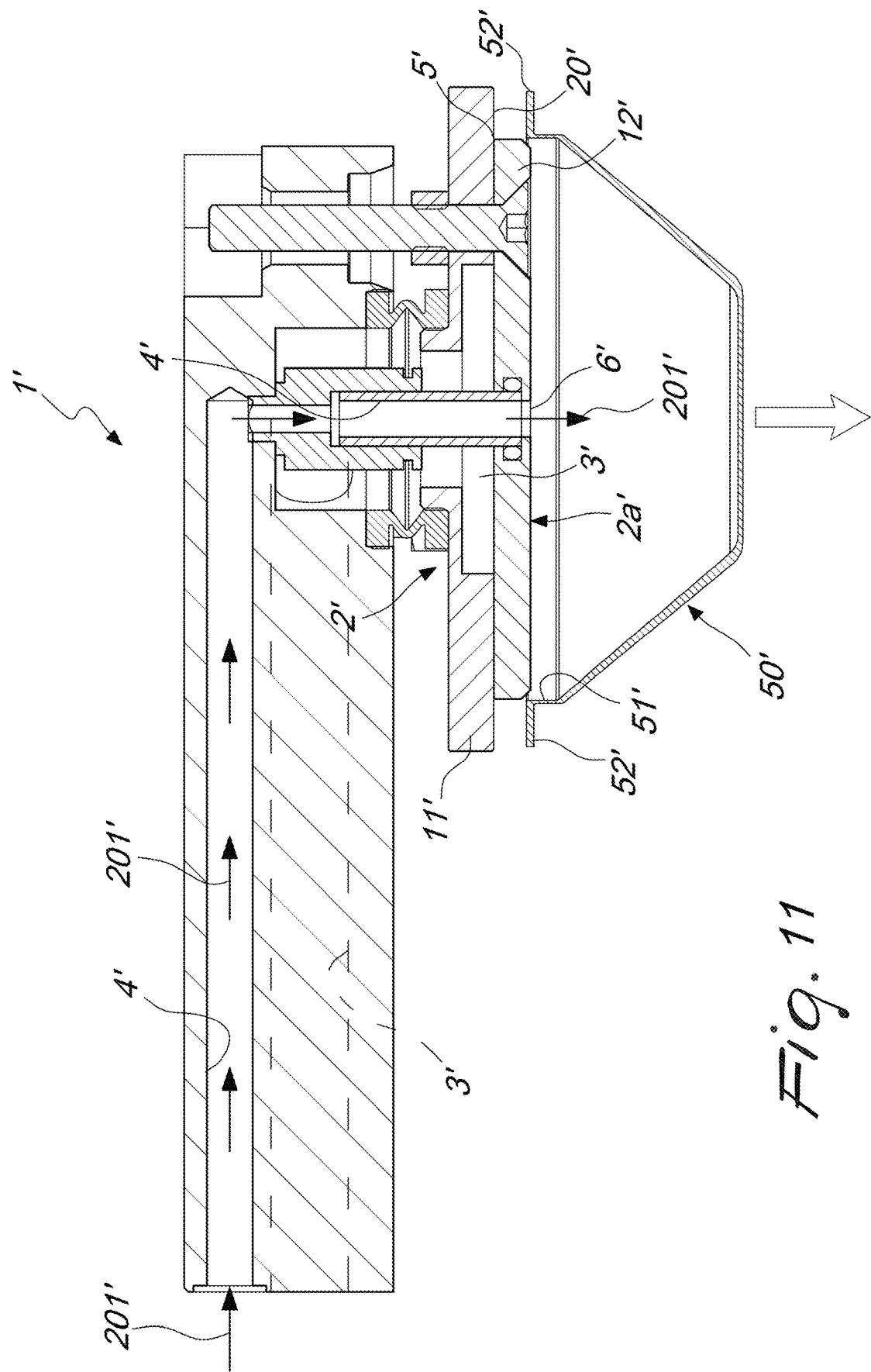
FIG. 11 is a view similar to that of FIG. 10, but wherein the preform is decoupled from the grip element.
Figure 12:
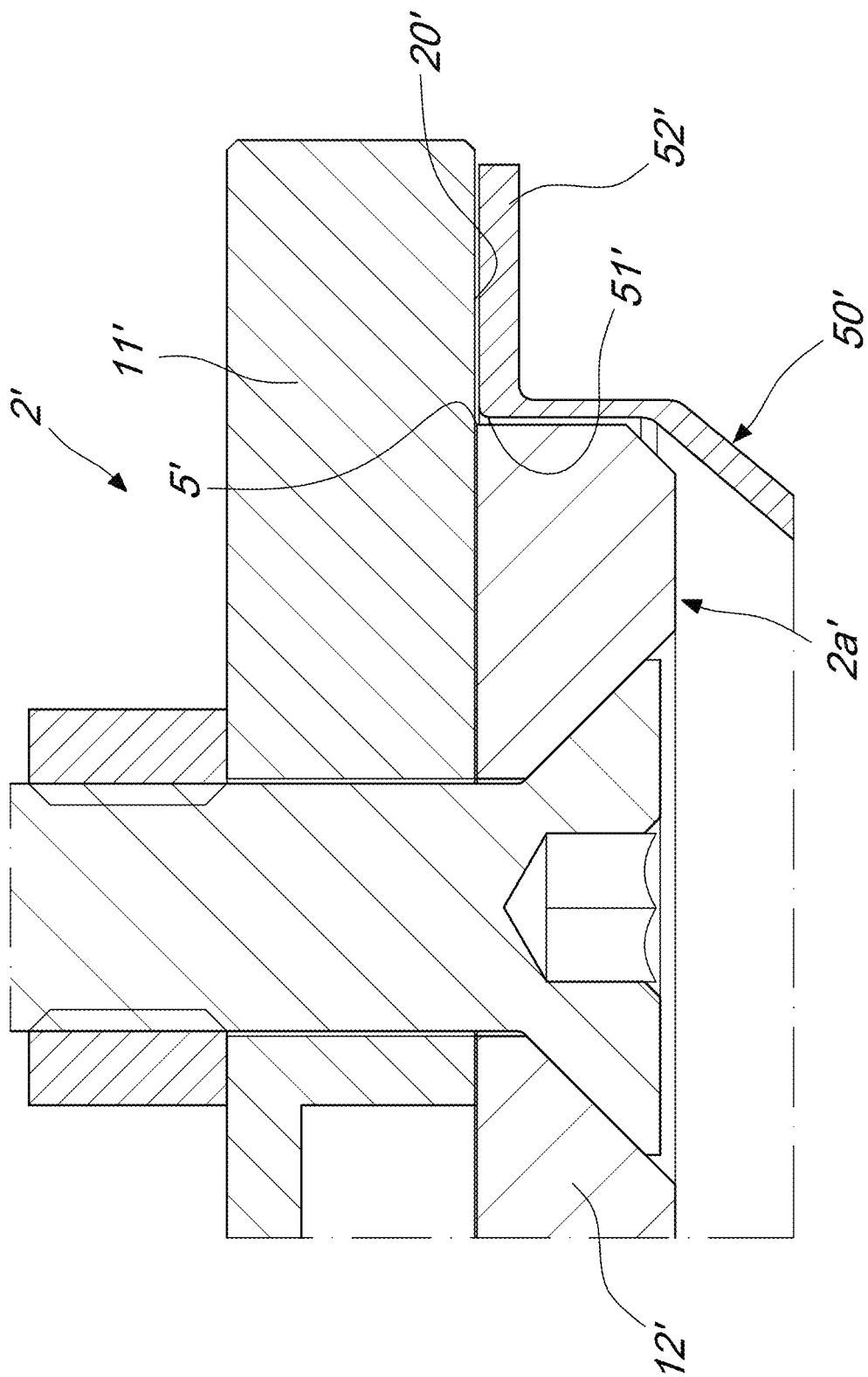
FIG. 12 is an enlargement of a portion of the cross-section of FIG. 10.
Figure 13:
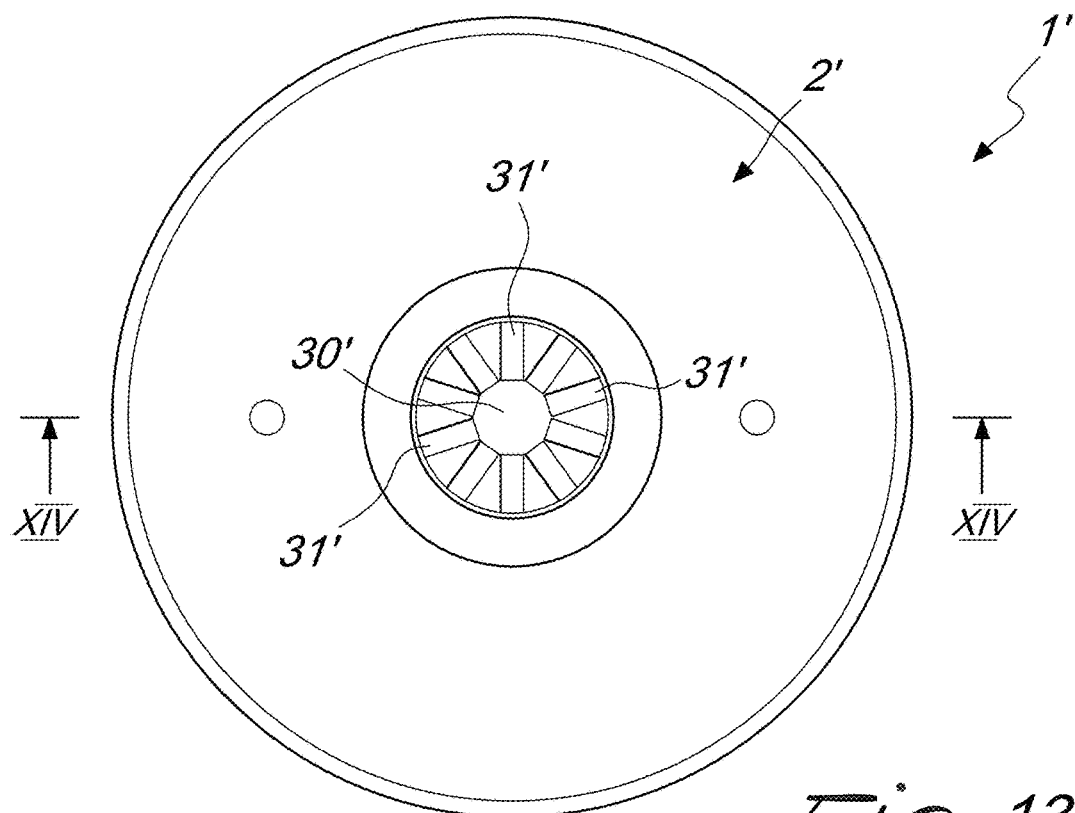
FIG. 13 is a front elevation view of a second embodiment of the grip body according to the disclosure.
Figure 14:
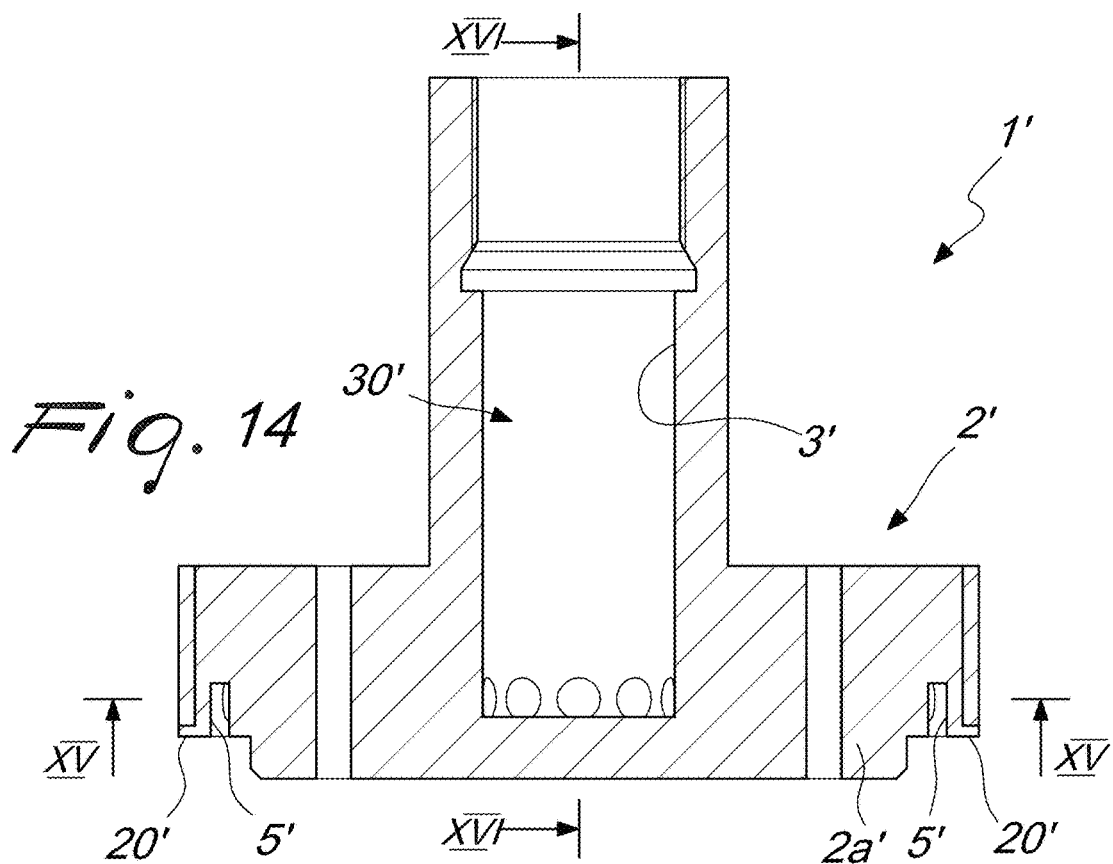
FIG. 14 is a cross-sectional view of the grip body taken along the plane of arrangement identified by the line XIV-XIV of FIG. 13.
Figure 15:
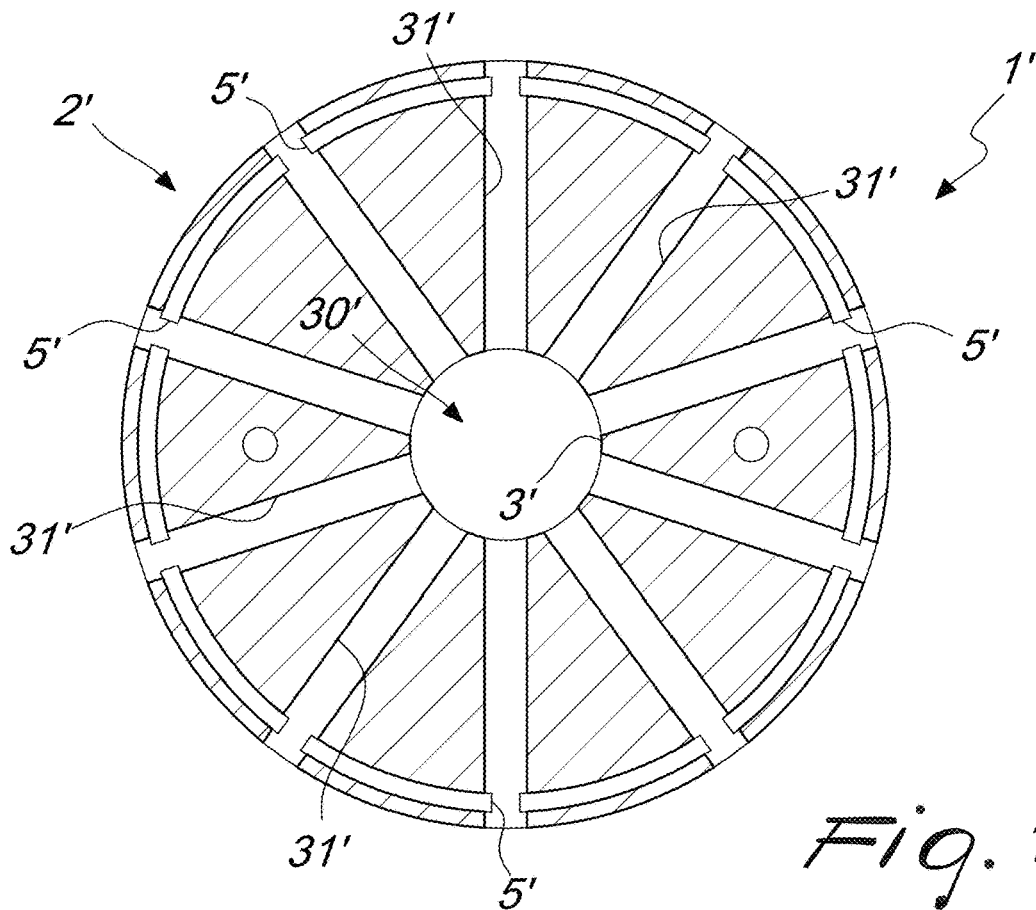
FIG. 15 is a cross-sectional view of the grip device taken along the plane of arrangement identified by the line XV-XV of FIG. 13.
Figure 16:
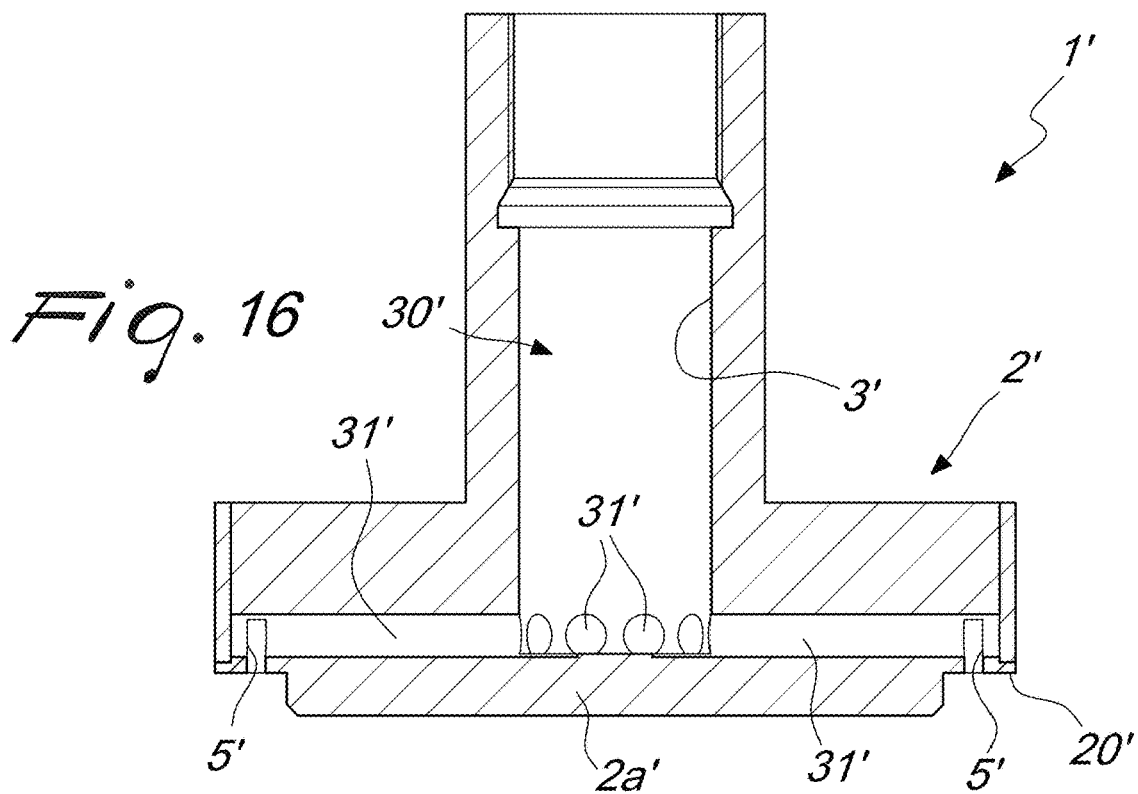
FIG. 16 is a cross-sectional view of the grip device taken along the plane of arrangement identified by the line XVI-XVI of FIG. 15.

With reference to the embodiment shown in FIGS. 10 to 12, the supporting element 2' comprises two plate-like elements 11', 12' which are arranged mutually facing and which define, between the respective mutually facing faces, a gap that can be passed through by the flow of air that is designed to exit from the at least one nozzle 5'.

In this case, the nozzle 5' comprises the outlet of the gap directed toward the outside.

With reference to such embodiment, the plate-like element 11' arranged above has a greater radial extension than the plate-like element 12' arranged below, so as to define the surface 20' that is designed to face toward the radial flaring 52'.

Alternatively, as shown in FIGS. 13 to 16, the grip device 1' comprises a supply conduit 3' constituted by a central hollow body 30', which during use is coaxial with the axis 100' of the preform 50' and is connected, by way of a plurality of radial conduits 31', to respective nozzles 5' which lead outward in order to strike the surface 20'.

Such solution, which is conceptually similar, while providing less holding force, appreciably reduces the amount of air necessary for its operation.

So it is possible to use grip devices 1' with a configuration similar to that shown in FIGS. 10 to 12 at star conveyors for feeding or unloading, in which rapid displacements are needed with short holding times, and grip devices with a configuration similar to that shown in FIGS. 13 to 16 can be used when the preforms 50' are to be held for relatively long periods of time, such as for example while passing through the conditioning oven arranged upstream of a blow-molding station.

According to a further aspect, the present disclosure relates to an apparatus for handling preforms 50' of plastic for the production of containers, which comprises a supporting body that can move on command and is associated with a grip device 1' according to one or more of the preceding claims Such supporting bodies can be integrated, as explained above, in star conveyors or manipulators for feeding or unloading preforms, or they can be associated with conveyor elements, for example catenaries, for passing through a conditioning oven.

The operation of the grip device 1' according to the disclosure is evident from the foregoing description.

In particular, with reference to what is shown in FIG. 10, air under pressure, for example generated by a compressor, is sent to the supply conduit 3' of a supporting device 2' according to the disclosure, under which a preform is arranged which is to be held and, optionally, moved.

The air flow passing through the supply conduit (shown with the arrow 200') is sent, through the gap between the two plate-like elements 11' and 12', to the nozzle 5' (which extends about the axis 100') so as to generate an air blade that strikes the surface 20' underneath, thus creating a partial vacuum that tends to keep the preform 50' "suspended", even though there is no contact, from the supporting element 2'.

When it is necessary to disengage the preform from the supporting element 2', it is possible to supply the air (as indicated by the arrow 201') to the delivery conduit 4', and therefore to the delivery port 6', so as to facilitate the disengagement of the preform 40' from the supporting element 2'.

In practice it has been found that the disclosure fully achieves the intended aim and objects by providing an apparatus for blow molding containers that makes it possible to feed preforms of different diameters and shapes, since it does not need to engage with the external surface of the preform.

The disclosure thus conceived is susceptible of numerous modifications and variations, all of which are within the scope of the appended claims Moreover, all the details may be substituted by other, technically equivalent elements.

In practice the materials employed, provided they are compatible with the specific use, and the contingent dimensions and shapes, may be any according to requirements and to the state of the art.

What is claimed is:

1. An apparatus for blow molding plastic containers, the apparatus comprising a blow molding carousel configured to rotate about a main rotation axis and operatively connected, at a first transfer station, to a feeding line of preforms that comprise a preform body and a preform mouth, said blow molding carousel supporting, at a peripheral region thereof, a plurality of forming units arranged around a main rotation axis, each forming unit comprising a mold formed by two mold parts configured to move with respect to each other in order to pass between an open position for feeding the preforms, and a closed position in which said forming unit defines at least one forming cavity, said first transfer station comprising a transfer carousel configured to rotate about an axis of the transfer carousel that is parallel to the main rotation axis, and supporting a plurality of grip elements associated with at least one respective grip body designed to pick up at least one respective preform from said feeding line in order to feed the respective preform to a respective forming cavity, said grip element comprising a first arm, which is supported so that said first arm rotates by said transfer carousel in order to rotate on command about a substantially vertical pivoting axis, and a second arm, which extends longitudinally and slides on command with respect to said first arm along an advancement/retraction direction which is substantially parallel to a direction of extension of said second arm, wherein said grip body supports a coupling element which is configured to stably hold said preform substantially by the preform mouth region, said coupling element being movable on command with respect to said second arm along a movement trajectory which has at least one component that is parallel to a vertical direction.

2. The apparatus according to claim 1, wherein said coupling element is operatively associated with air suction/pressure means and is configured to couple hermetically with said preform mouth to hold said preform.

3. The apparatus according to claim 1, wherein said grip body is supported so that said grip body slides by said second arm along a substantially vertical movement direction.

4. The apparatus according to claim 1, wherein said grip body is designed to move along said movement trajectory substantially at a step of disengagement from said preform mouth.

5. The apparatus according to claim 1, wherein said coupling element comprises an element configured to expand radially on command in order to engage against an internal surface of said preform substantially at said preform mouth to hold said preform.

6. The apparatus according to claim 1, further comprising a first cam which is supported by a supporting structure and configured to be engaged by at least one first engagement element associated with said first arm in order to control an angular position of said first arm about said substantially vertical pivoting axis during a rotation of the first arm about the axis of the transfer carousel.

7. The apparatus according to claim 6, wherein said first arm comprises a supporting rocker which is hinged to said transfer carousel in order to rotate about said pivoting axis and is provided with a cam follower which defines said at least one first engagement element and is designed to come into contact with said first cam which is adapted to control an angular position of said supporting rocker about said pivoting axis.

8. The apparatus according to claim 1, wherein said grip body is supported to rotate by said second arm in order to rotate on command about a tilting axis which is substantially horizontal and substantially perpendicular to said advancement/retraction direction.

9. The apparatus according to claim 6, further comprising a second cam which is supported by said supporting structure and configured to be engaged by at least one second engagement element which is associated with said second arm in order to control a longitudinal position of said second arm with respect to said first arm along said advancement/retraction direction during a rotation of said second arm about the axis of the transfer carousel.

10. The apparatus according to claim 9, further comprising a third cam which is supported by said supporting structure and configured to be engaged by at least one third engagement element which is associated with said grip body in order to control an angular position of said grip body with respect to said second arm about said tilting axis during a rotation of the grip body about the axis of the transfer carousel.

11. The apparatus according to claim 1, wherein said grip body is designed to move along said movement trajectory after the release of the preform at the respective forming cavity, to facilitate the disengagement of said coupling element from said mold.

12. The apparatus according to claim 1, wherein said feeding line is arranged downstream of a conditioning oven for said preforms.

\* \* \* \* \*